United States Patent [19]
Wegener, II

[11] Patent Number: 4,559,189
[45] Date of Patent: Dec. 17, 1985

[54] METHOD OF MANUFACTURING SIMULATED ANIMAL OR FISH SKIN

[76] Inventor: Joseph B. Wegener, II, 4618 W. Fairmont, Phoenix, Ariz. 85031

[21] Appl. No.: 582,836

[22] Filed: Feb. 23, 1984

[51] Int. Cl.[4] .............................................. B29C 1/02
[52] U.S. Cl. .................................... 264/39; 264/222; 264/DIG. 30
[58] Field of Search ................. 264/39, 220, 222, 225, 264/316, DIG. 30; 425/2

[56] References Cited
U.S. PATENT DOCUMENTS

| | | | |
|---|---|---|---|
| 3,190,947 | 6/1965 | Norcross | 264/166 |
| 3,989,790 | 11/1976 | Bruner et al. | 264/225 |

Primary Examiner—Donald Czaja
Assistant Examiner—V. Fischbach
Attorney, Agent, or Firm—Don J. Flickinger

[57] ABSTRACT

A method of manufacturing simulated animal or fish skin includes pouring a silicone compound over a sample of the skin to be simulated as, for example, dried fish skin. After the silicone compound jells, it is removed from the sample as a layer and forms a mold of the skin to be simulated. The mold is then cleaned and covered with a fiberglass cloth. A flex resin compound is poured onto the fiberglass cloth to fill the mold. After waiting a predetermined period of time, the fiberglass cloth is removed leaving behind the simulated skin which may then be painted to achieve realism. The painted simulated skin may then have a backing material such as cloth or vinyl applied thereto and the composite material cut to a desired shape.

14 Claims, 1 Drawing Figure

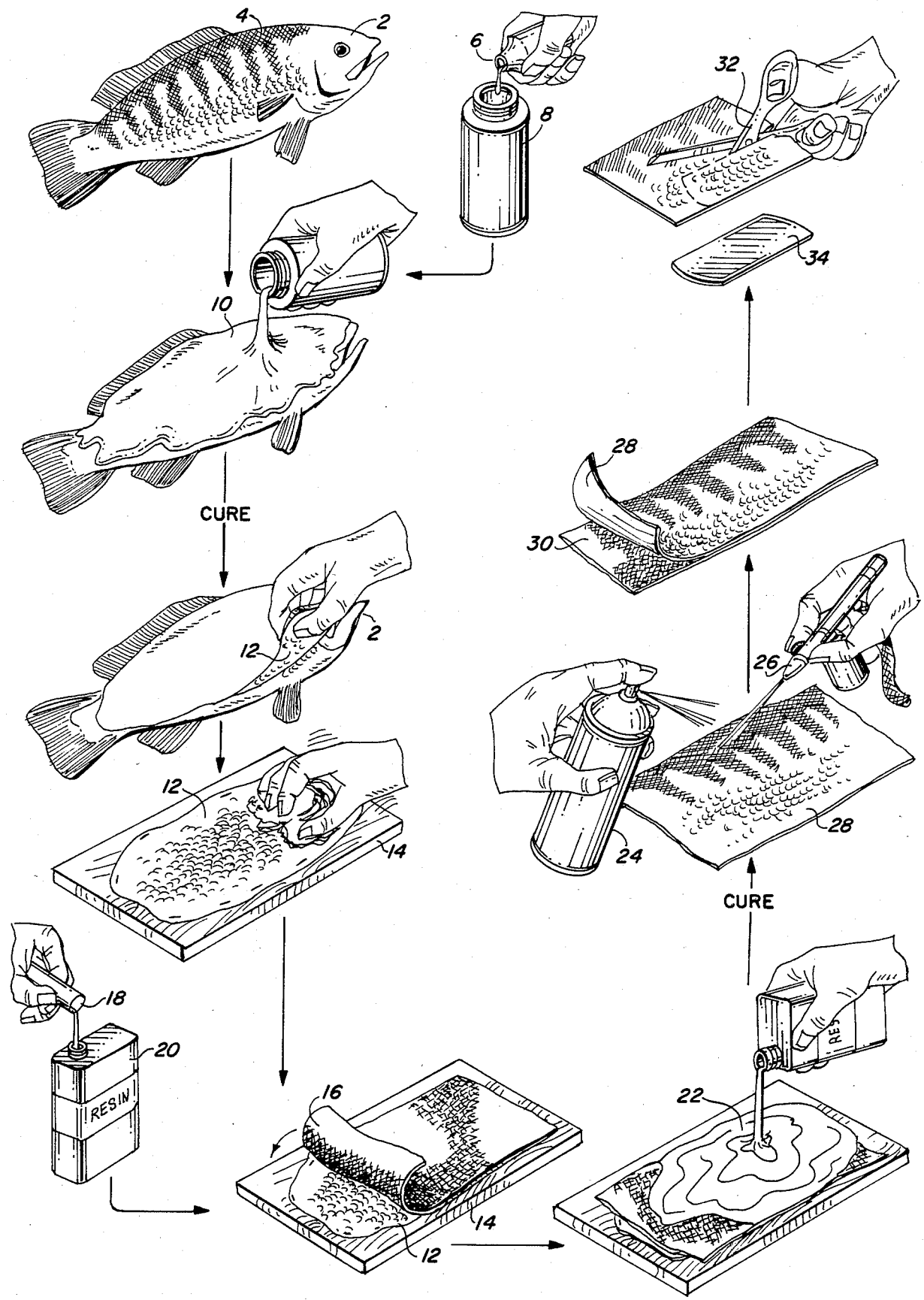

METHOD OF MANUFACTURING SIMULATED ANIMAL OR FISH SKIN

BACKGROUND

1. Field of the Invention

This invention relates generally to an article of manufacture including simulated or artificial animal or fish skin and, more specifically, to a method of making same.

2. Prior Art

It is well known that hunters, fishermen and the like will often display their catches by having them processed by a taxidermist. Alternatively, such enthusiasts may produce, have produced or simply purchase certain items such as belt buckles, hat bands and the like which are made from the skins of fish or other animals. Unfortunately, it is difficult to satisfy the demand for such articles since the skins are relatively difficult to obtain. Furthermore, their scarcity renders the skins, and therefore the articles produced therefrom, very expensive.

SUMMARY OF THE INVENTION

It is an object of the present invention to provide an improved method for producing simulated or artificial animal or fish skin.

It is a further object of the present invention to provide an article of manufacture including simulated animal or fish skin made by a new and improved method.

According to a broad aspect of the invention there is provided a method of manufacturing simulated skin, comprising pouring a silicone compound over a sample of genuine skin to be simulated. This may be, for example, a dead and dried fish Next, the layer of silicone compound is removed from the skin sample after it has jelled so as to produce a mold. The mold is then cleaned with, for example, acetone, and the surface of the mold exhibiting the simulated skin surface is covered with a fiberglass cloth. A flex resin compound is then poured through the fiberglass cloth to fill the mold. After removing the fiberglass cloth, the simulated skin may be painted to effect realism of appearance, and a backing material such as vinyl is applied. A composite may then be cut to a desired shape depending on the product to be acheived. Standard injection molding techniques may also by used to produce the simulated skin.

BRIEF DESCRIPTION OF THE DRAWINGS

The above, and other objects, features and advantages of the present invention will be more clearly understood from the following detailed description taken in conjunction with the accompanying drawing which is a flow chart of the inventive process for producing simulated or artificial skin.

DESCRIPTION OF THE PREFERRED EMBODIMENT

The inventive process for manufacturing simulated animal or fish skin first requires that a sample of genuine skin be obtained. As can be seen from the drawing, this is accomplished by obtaining, for example, a dead, dry fish 2 having a scaly skin 4. A catalyst 6 is then added to a silicone compound 8 (e.g. commercially available Silicone-J such as Silastic ® J RTV silicone rubber available from Dow Corning which is a two-component, room-temperature-addition-reaction-vulcanizing silicone rubber designed for use as a flexible potting, encapsulating or mold-making material for urethane foams and other cast plastics, the use of which would be obvious to one skilled in the art from information contained in Dow Corning's data sheets and is manually mixed in accordance with instructions included therewith. The resultant material is then poured over scaly skin 4 of fish 2 as is shown at 10. The silicone material is allowed to cure for approximatey eight hours until it jells, and a layer of the jelled silicone material 12 is peeled off fish 2.

This layer 12 forms a skin mold and is secured (scale side up) to a board 14 as, for example, by stapling. If desired, the mold may now be cut to any desired shape; however, it is not necessary to perform the cutting step at this point.

Next, the mold is cleaned with a recommended cleaner or acetone in the standard and well known manner. After cleaning, a fiberglass cloth 16 is placed over the mold. A catalyst 18 is added to a flex resin 20 (e.g., of the type available from Koppers Co., Inc., Pittsburg, Pa. and identified by Nos. 1201-5 and 1000-25) in accordance with information included on the data sheet available therewith, and the result is poured over the fiberglass cloth as is shown at 22. The use of such resins would be obvious to one skilled in the art in view of published information available from Koppers Co. Porous flex resin passes through the fiberglass and fills the mold. This material is then allowed to set for approximately fifteen to twenty minutes at approximately 100° F. For belt buckles and other rigid items, a stiff-setting (rigid) resin may be used.

Fiberglass cloth 16 is peeled away, and the resultant simulated skin is allowed to either air cure for approximately eight hours or is heated for approximately two hours at approximately 150° F. The product thus acheived may also be produced using standard injection molding techniques.

If desired, the resultant simulated skin may be sprayed with a clear lacquer to seal it approximately one hour after peeling of the fiberglass cloth; however, this is not a necessary step.

Next, the simulated skin is painted in the same manner a taxidermist would paint an actual skin, so as to increase its realism in appearance. That is, the painting will result in a simulated skin which resembles in color and shading the animal or fish whose skin is to be simulated. This is shown graphically by spray can 24 and air brush 26 each of which are depositing paint to add color to simulated skin 28. After painting, the simulated skin may be sprayed with a clear lacquer if desired.

Next, a backing material 30, such as cloth or vinyl, is secured to simulated skin 28 as for example by gluing with a waterproof glue.

Finally, the composite simulated skin/backing material is cut to a desired shape as is shown at 32. The resulting shaped section may then be glued or sewn onto a desired base (e.g. 34) to form a belt buckle, hat band, or the like.

The above description is given by way of example only. Changes in form and details may be made by one skilled in the art without departing from the scope of the invention as defined by the appended claims:

I claim:

1. A method of manufacturing simulated skin, comprising:

pouring a silicone compound over a sample of genuine skin to be simulated;

removing the silicone compound from said sample as a layer after it is jelled to produce a mold;
cleaning the mold;
covering the surface of said mold exhibiting the simulated skin surface with a fiberglass cloth;
pouring a flex resin compound through said fiberglass cloth to fill said mold; and
removing the fiberglass cloth leaving said simulated skin.

2. A method according to claim 1 further comprising steps of:
painting said simulated skin to effect realism of appearance;
applying a backing material to said simulated skin; and
cutting the composite simulated skin/backing material to a desired shape.

3. A method according to claim 2 wherein the layer of silicone compound is cut to a desired shape after it is removed from the sample.

4. A method according to claim 2 wherein said mold is cleaned with acetone.

5. A method according to claim 2 wherein said silicone compound is cured for approximately eight hours after it is poured over said sample.

6. A method according to claim 2 wherein the flex resin poured onto the fiberglass cloth to fill the mold is cured for approximately fifteen to twenty minutes at approximately 100° F.

7. A method according to claim 6 wherein the simulated skin is air cured for approximately eight hours after removal of said fiberglass cloth.

8. A method according to claim 6 wherein said simulated skin is heated for approximately two hours at a temperature of approximately 150° F. after removal of the fiberglass cloth.

9. A method according to claim 6 wherein said simulated skin is sealed with a sealer after removal of said fiberglass cloth.

10. A method according to claim 9 wherein said sealer is a clear lacquer.

11. A method according to claim 6 wherein a layer of clear lacquer is applied to said simulated skin after painting.

12. A method according to claim 2 wherein said backing material is cloth.

13. A method according to claim 2 wherein said backing material is vinyl.

14. A method according to claim 2 wherein said backing material is glued to said simulated skin.

* * * * *